United States Patent
Yoshida et al.

(10) Patent No.: US 8,088,876 B2
(45) Date of Patent: Jan. 3, 2012

(54) COPOLYMER, RESIN FOR ELECTROPHOTOGRAPHIC FUNCTIONAL COMPONENT PARTS, DEVELOPING ROLLER, AND ELECTROPHOTOGRAPHIC APPARATUS

(75) Inventors: Tatsurou Yoshida, Tsukuba (JP); Eri Yagi, Yokohama (JP)

(73) Assignee: Canon Kasei Kabushiki Kaisha, Tsukuba-shi (JP)

( * ) Notice: Subject to any disclaimer, the term of this patent is extended or adjusted under 35 U.S.C. 154(b) by 682 days.

(21) Appl. No.: 12/200,702

(22) Filed: Aug. 28, 2008

(65) Prior Publication Data

US 2009/0060597 A1    Mar. 5, 2009

(30) Foreign Application Priority Data

Aug. 31, 2007 (JP) ................................ 2007-226241
Aug. 31, 2007 (JP) ................................ 2007-226250

(51) Int. Cl.
*C08F 220/10* (2006.01)
(52) U.S. Cl. ........................ 526/329.5; 528/75; 399/286
(58) Field of Classification Search ............... 526/329.5; 528/75; 399/286
See application file for complete search history.

(56) References Cited

U.S. PATENT DOCUMENTS

| 6,316,157 | B1 * | 11/2001 | Yoshikawa et al. ........ 430/108.3 |
| 2005/0024458 | A1 * | 2/2005 | Sanada et al. ................ 347/100 |
| 2006/0194935 | A1 | 8/2006 | Aoshima et al. |

FOREIGN PATENT DOCUMENTS

| JP | 8-296631 | A | | 11/1996 |
| JP | 9-114190 | A | | 5/1997 |
| JP | 2000-242033 | A | | 9/2000 |
| JP | 2001-042663 | A | | 2/2001 |
| JP | 2002-244426 | A | | 8/2002 |
| JP | 2003-005507 | A | | 1/2003 |
| JP | 2005-031656 | A | | 2/2005 |
| JP | 2005-031657 | A | | 2/2005 |
| JP | 2005031657 | | * | 2/2005 |
| JP | 2005-113057 | A | | 4/2005 |

* cited by examiner

*Primary Examiner* — Robert D. Harlan
(74) *Attorney, Agent, or Firm* — Fitzpatrick, Cella, Harper & Scinto

(57) ABSTRACT

A copolymer obtained by copolymerizing at least one monomer selected from specific acrylate or methacrylate monomers, at least one monomer selected from specific amino group-containing monomers and at least one monomer selected from specific polar group-containing monomers. A resin for electrophotographic functional component parts, which contains this copolymer, a developing roller in which a cover layer serving as a surface layer contains the copolymer as a positive charge control resin, and an electrophotographic apparatus that includes the developing roller.

7 Claims, 1 Drawing Sheet

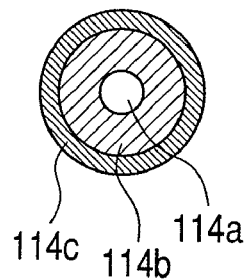
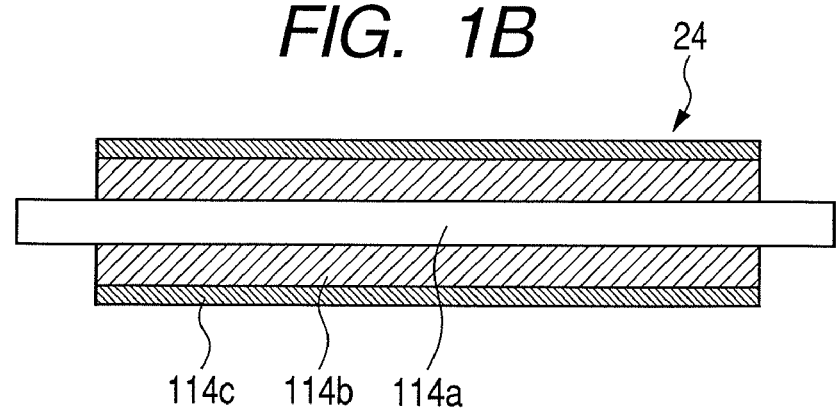
FIG. 1A
FIG. 1B
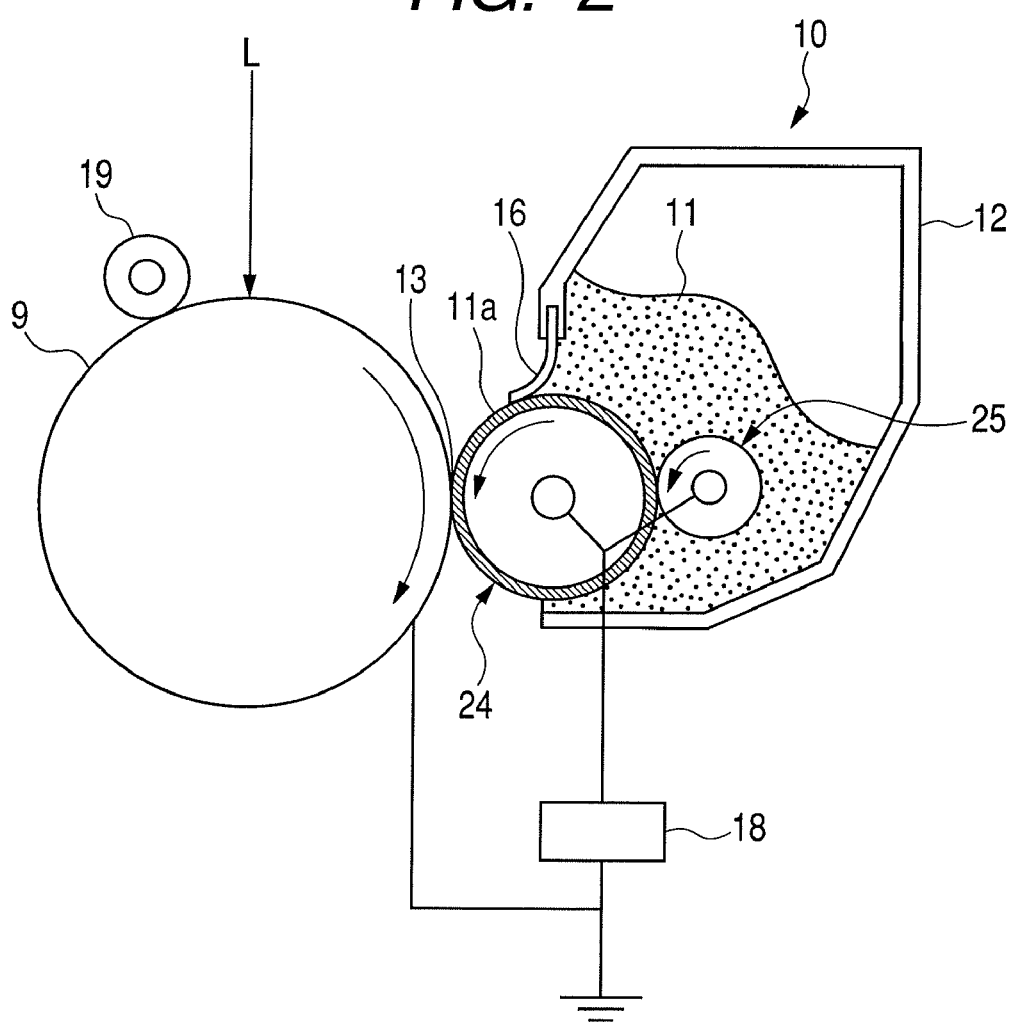
FIG. 2

COPOLYMER, RESIN FOR ELECTROPHOTOGRAPHIC FUNCTIONAL COMPONENT PARTS, DEVELOPING ROLLER, AND ELECTROPHOTOGRAPHIC APPARATUS

BACKGROUND OF THE INVENTION

1. Field of the Invention

This invention relates to a copolymer obtained by copolymerizing specific monomers and a resin for electrophotographic functional component parts, which makes use of the same. It also relates to a developing roller and an electrophotographic apparatus.

2. Related Background Art

Electrophotographic apparatuses utilizing a dry-process electrophotographic system, such as copying machines, laser beam printers, facsimile machines, printers, and the like, are known in the art. In an image forming apparatus, such as an electrophotographic apparatus, the surface of an electrostatically charged image bearing member (hereinafter also "photosensitive member") is electrostatically and uniformly charged, then an electrostatically charged image is formed on the surface thereof by an electrostatically charged image forming unit including an exposure means, and this electrostatically charged image (latent image) is developed as a toner image by means of a developing assembly. A charging member, which charges the photosensitive member electrostatically, a developing member, which feeds a developer to the electrostatically charged image, a toner feed member, which feeds the developer to the developing member, and so forth, which are provided in such an electrophotographic apparatus, are required to have an appropriate flexibility and are made from a urethane resin having a rubber elasticity. In order to achieve good nips in these electrophotographic functional component parts, it is preferable for the urethane resin to have a low hardness. However, using a low hardness urethane resin makes these component parts tacky, what is called stickiness, on their surfaces. Toner does not separate well from such component parts having a high surface tackiness. Thus, the toner may adhere to the surfaces of component parts during use and negatively affect their characteristics.

To reduce the surface tackiness, proposed are, e.g., a method in which dimethylsiloxane is mixed (Japanese Patent Laid-open Application No. H08-296631), a method in which the proportion of a polyol component with respect to an isocyanate component is controlled (Japanese Patent Laid-open Application No. H09-114190) and a method in which a fluorine resin is mixed (Japanese Patent Laid-open Application No. 2001-042663).

Meanwhile, to obtain a urethane resin for electrophotographic functional component parts by a urethanation reaction of a polyol component with an isocyanate component, a catalyst, such as an amino compound, is required in many cases. However, in component parts formed using such a urethane resin, which was obtained using the amino compound as a catalyst, the remaining amino compound may exude during use to stain other component parts and cause difficulties.

In order to keep such other component parts from being stained because of the amino compound catalyst remaining in the urethane resin for electrophotographic functional component parts, a method is proposed in which a catalyst having a hydroxyl group in the molecule is used (Japanese Patent Laid-open Application No. 2005-113057).

However, no resin for electrophotographic functional component parts has been proposed that can both reduce surface tackiness and prevent staining caused by the exuded amino catalyst compound, which is used for the polymerization reaction. Thus, there is a demand for a resin that can solve these problems simultaneously.

A developing roller as the developing member is required to uniformly and sufficiently triboelectrically charge the toner and further transport the toner while holding it thereon. However, with electrophotographic apparatuses becoming high-speed and high-image quality devices in recent years, the deterioration of toners has accelerated. Specifically, the toner tends to stick to the developing roller surface and may be insufficiently fed to the electrostatically charged images to cause a decrease in image density or fogging. Accordingly, a developing roller is needed that has an improved triboelectric charging performance with respect to the toner, can increase the toner charge, and can perform sufficient triboelectric charging even when a toner has deteriorated.

The developing roller has an electrically conductive shaft and an elastic layer provided on its peripheral surface. It also optionally includes a cover layer on the surface. Such a developing roller is commonly used. The surface of the developing roller must be formed using a negatively chargeable material where the toner is to be positively charged and a positively chargeable material where the toner is to be negatively charged. Known in the art are a method in which a charge control agent is added to a resin that forms a surface layer and a method in which a surface layer is formed of a charge control resin. Stated specifically, a method is reported in which a coating film is formed on the developing roller or sleeve by using a charge control resin soluble in an organic solvent (Japanese Patent Laid-open Applications Nos. 2000-242033, 2002-244426 and 2003-005507). In all of these documents, in the coating film formed on the developing roller or the like, a copolymer chiefly made from an amino group-containing acrylate or a methacrylate monomer and methyl methacrylate is used as the charge control resin.

In a developing roller intended to improve image characteristics by increasing the charge of the toner, the present inventors have reported that a positive charge control resin is used to which an acrylate or a methacrylate copolymer having an alkyl group having 4 or more carbon atoms with an amino group-containing compound has been added (Japanese Patent Laid-open Applications Nos. 2005-031656 and 2005-031657). In this developing roller using such a positive charge control resin, the alkyl group having 4 or more carbon atoms that is contained in the acrylate or methacrylate unit promotes the surface orientation of the amino group contained in the amino group-containing monomer unit to improvement negative chargeability of the toner.

In this developing roller, image characteristics can be recognized to have been improved because of an increase in the negative charge quantity of the toner by adding the above positive charge control resin to a surface layer. However, difficulties in image characteristics, which are presumed to be caused by the charge-up of the toner, such as blotches, may come about depending on image evaluation conditions.

SUMMARY OF THE INVENTION

An object of the present invention is to provide a copolymer, which can promote a urethanation reaction without the use of any amino compound as a catalyst in the urethanation reaction of a polyol with an isocyanate and can prevent any bleed-out from a molded product to be obtained over a long period of time.

Another object of the present invention is to provide a copolymer or a resin, which can prevent surfaces of electrophotographic functional component parts obtained using this copolymer or resin from being tacky even though the copolymer or resin has a low hardness and can keep the surfaces from being stained with materials exuded from the electrophotographic functional component parts.

Still another object of the present invention is to provide a developing roller as an electrophotographic functional component part, which can provide a negatively chargeable developer with sufficient negative electric charges, can perform a good transport of the developer, and can keep the toner from its charge-up. It is also an object of the present invention to provide a developing roller, which, as it is used, can maintain high-density images and prevent them from fogging even if these images are obtained at the end period of the running operation.

A further object of the present invention is to provide a high-speed and high-image quality electrophotographic apparatus, which can form high-density images over a long period of time without fogging.

As a result of extensive studies, the present inventors have discovered that the above objects can be achieved by incorporating a copolymer obtained by copolymerizing a specific acrylate or methacrylate and a specific amino group-containing monomer and, in addition thereto, a specific polar group-containing monomer.

The present invention is concerned with a copolymer obtained by copolymerizing at least one monomer selected from acrylate or methacrylate monomers represented by Formulas (1) and (2), at least one monomer selected from amino group-containing monomers represented by Formulas (3) and (4) and at least one monomer selected from polar group-containing monomers represented by Formulas (5) and (6):

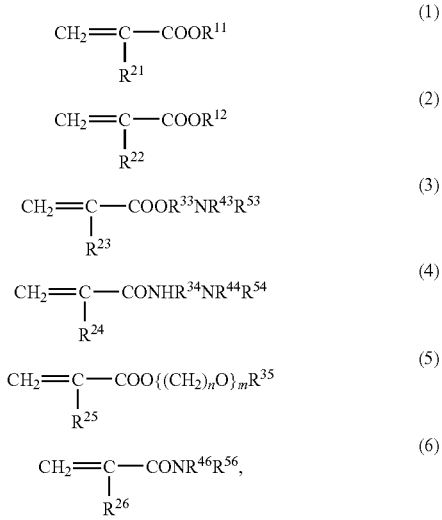

wherein $R^{11}$ represents an alkyl group having 4 or more carbon atoms; $R^{12}$ represents a fluoroalkyl group having 1 to 14 carbon atoms, having 3 or more fluorine atoms; $R^{21}$, $R^{22}$, $R^{23}$, $R^{24}$, $R^{25}$ and $R^{26}$ each independently represent a hydrogen atom or a methyl group; $R^{33}$ and $R^{34}$ each independently represent a divalent organic group having 1 to 7 carbon atoms; $R^{43}$, $R^{53}$, $R^{44}$, $R^{54}$, $R^{46}$ and $R^{56}$ each independently represent a hydrogen atom or an organic group having 1 to 20 carbon atoms, where $R^{43}$ and $R^{53}$, $R^{44}$ and $R^{54}$, and $R^{46}$ and $R^{56}$ may each chemically combine to form a cyclic structure consisting of the nitrogen atom to which these are bonded and 4 to 20 carbon atoms, or a cyclic structure consisting of the nitrogen atom to which these are bonded, at least one selected from an oxygen atom, a nitrogen atom and a sulfur atom and 4 to 19 carbon atoms; $R^{35}$ represents a hydrogen atom or an alkyl group having 8 or fewer carbon atoms; and n represents an integer of 2 or 3 and m represents an integer of any of 1 to 30.

The present invention is also concerned with a resin for electrophotographic functional component parts, which contains a urethane resin obtained using a urethane material containing a polyol component and an isocyanate component, the resin for electrophotographic functional component parts being characterized in that the urethane material contains the above copolymer.

The present invention is also concerned with a developing roller, which has an electrically conductive shaft and an elastic layer and at least one cover layer, in this order, superposed on the peripheral surface of the shaft, and which develops an electrostatically charged image on an electrostatically charged image bearing member by the use of a negatively chargeable developer carried on the surface of the developing roller. This developing roller comprises the resin for electrophotographic functional component parts, which is characterized in that the cover layer serving as a surface layer contains the above copolymer as a positive charge control resin.

The present invention is further concerned with an electrophotographic apparatus, which has an electrostatically charged image bearing member, a charging assembly for electrostatically charging the surface of the electrostatically charged image bearing member uniformly, an electrostatically charged image forming unit for forming an electrostatically charged image on the surface of the electrostatically charged image bearing member thus charged, a developing assembly for transporting a negatively chargeable developer to the electrostatically charged image formed on the surface of the electrostatically charged image bearing member to form a toner image thereon, and a transfer assembly for transferring the toner image to a recording material. The developing assembly of this electrophotographic apparatus has the above developing roller.

The copolymer of the present invention can promote a urethanation reaction without the use of any amino compound as a catalyst in the urethanation reaction of a polyol with an isocyanate and can prevent any bleed-out from a molded product to be obtained over a long period of time. Further, in the electrophotographic functional component parts obtained using the copolymer of the present invention, the copolymer can prevent surface tackiness, even though the materials has a low hardness, and can keep the surfaces from being stained by materials exuded out of the electrophotographic functional component parts.

In particular, the developing roller of the present invention can provide a negatively chargeable developer with sufficient negative electric charges, can perform a good transport of the developer, can keep the toner from its charge-up, and, as it is being used, can provide high-density images and prevent them from fogging even if these images are obtained at the end period of a running operation.

The electrophotographic apparatus of the present invention, even if it is a high-speed, high-image quality electrophotographic apparatus, can form high-density images and prevent fogging over a long period of time.

Other features of the present invention will become apparent from the following description of exemplary embodiments with reference to the attached drawings.

BRIEF DESCRIPTION OF THE DRAWINGS

FIGS. 1A and 1B are views showing an example of the developing roller of the present invention.

FIG. 2 is a schematic structural view showing an example of the electrophotographic apparatus of the present invention.

DETAILED DESCRIPTION OF THE INVENTION

In the copolymer of the present invention, at least one monomer is selected from each of acrylate or methacrylate monomers represented by Formulas (1) and (2), amino group-containing monomers represented by Formulas (3) and (4) and polar group-containing monomers represented by Formulas (5) and (6). Then, it includes a copolymer obtained by copolymerizing the monomers selected.

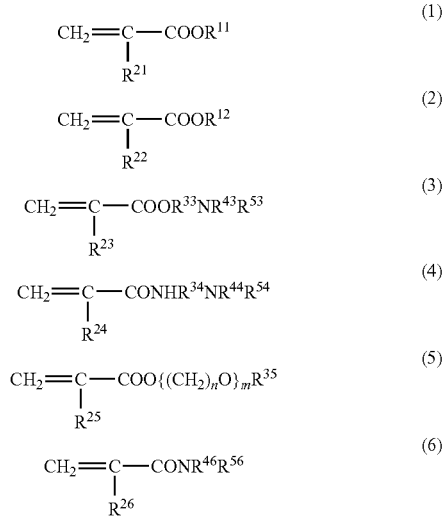

In Formula (1), $R^{11}$ represents an alkyl group having 4 or more carbon atoms, which may preferably be an alkyl group having 20 or less carbon atoms. In Formula (1), $R^{21}$ represents a hydrogen atom or a methyl group. The acrylate or methacrylate monomer represented by Formula (1) may specifically include n-butyl (meth)acrylate, t-butyl (meth)acrylate, iso-butyl (meth)acrylate, n-amyl (meth)acrylate, n-hexyl (meth)acrylate, cyclohexyl (meth)acrylate, 2-ethylhexyl (meth)acrylate, n-octyl (meth)acrylate, iso-octyl (meth)acrylate, n-nonyl (meth)acrylate, n-decyl (meth)acrylate, iso-decyl (meth)acrylate, n-lauryl (meth)acrylate, n-tridecyl (meth) acrylate, n-stearyl (meth)acrylate, or isobornyl (meth) acrylate. Here, the term "(meth)acrylate" is used to refer to an acrylate or a methacrylate (the same applies hereinafter).

In Formula (2), $R^{12}$ represents a fluoroalkyl group having 1 to 14 carbon atoms with 3 or more fluorine atoms. In such a fluoroalkyl group, all hydrogen atoms may be replaced by fluorine atoms. $R^{22}$ in Formula (2) represents a hydrogen atom or a methyl group. The acrylate or methacrylate monomer represented by Formula (2) may specifically include 2,2,2-trifluoroethyl (meth)acrylate, 2,2,3,3,3-pentafluoropropyl (meth)acrylate, 3,3,4,4,5,5,6,6,6-nonafluorohexyl (meth)acrylate, 3,3,4,4,5,5,6,6,7,7,8,8,8-tridecafluorooctyl (meth)acrylate, 3,3,4,4,5,5,6,6,7,7,8,8,9,9,10,10,10-heptadecafluorodecyl (meth)acrylate, 3,3,4,4,5,5,6,6,7,7,8,8,9,9,10,10,11,11,12,12,12-heneicosafluorododecyl (meth)acrylate, 1-trifluoromethyl-2,2,2-trifluoroethyl (meth)acrylate, 5-trifluoromethyl-3,3,4,4,5,6,6,6-octafluorohexyl (meth) acrylate, 7-trifluoromethyl-3,3,4,4,5,5,6,6,7,8,8,8-dodecafluorooctyl (meth)acrylate, 9-trifluoromethyl-3,3,4,4,5,5,6,6,7,7,8,8,9,9,10,10,10-hexadecafluodecyl (meth)acrylate, 11-trifluoromethyl-3,3,4,4,5,5,6,6,7,7,8,8,9,9,10,10,11,12, 12,12-eicosafluorododecyl (meth)acrylate, 2,2,3,3-tetrafluoropropyl (meth)acrylate, 2,2,3,3,4,4,5,5-octafluoropentyl (meth)acrylate, 2,2,3,3,4,4,5,5,6,6,7,7-dodecafluoroheptyl (meth)acrylate, or 2,2,3,3,4,4,5,5,6,6,7,7,8,8,9,9-hexafluorononyl (meth)acrylate.

In Formula (3), $R^{23}$ represents a hydrogen atom or a methyl group, and $R^{33}$ represents a divalent organic group having 1 to 7 carbon atoms. Such an organic group may include chain-like or cyclic aliphatic alkenyl groups and divalent aromatic hydrocarbon groups. In Formula (3), $R^{43}$ and $R^{53}$ each independently represent a hydrogen atom or an organic group having 1 to 20 carbon atoms. Such an organic group may include chain-like or cyclic aliphatic alkyl groups and aromatic hydrocarbon groups. $R^{43}$ and $R^{53}$ may also chemically combine to form a cyclic structure consisting of the nitrogen atom to which these are bonded and, in addition thereto, 4 to 20 carbon atoms. $R^{43}$ and $R^{53}$ may also chemically combine to form a cyclic structure consisting of the nitrogen atom to which these are bonded and, in addition thereto, at least one selected from an oxygen atom, a nitrogen atom, and a sulfur atom and 4 to 19 carbon atoms. The amino group-containing monomer represented by Formula (3) may specifically include N,N-dimethylaminomethyl (meth)acrylate, N,N-diethylaminomethyl (meth)acrylate, N,N-dimethylaminoethyl (meth)acrylate, N,N-diethylaminoethyl (meth)acrylate, N,N-dimethylaminopropyl (meth)acrylate, N,N-dimethylaminobutyl (meth)acrylate, p-N,N-dimethylaminophenyl (meth)acrylate, p-N,N-diethylaminophenyl (meth)acrylate, p-N,N-dipropylaminophenyl (meth)acrylate, p-N,N-dibutylaminophenyl (meth)acrylate, p-N-laurylaminophenyl (meth)acrylate, p-N-stearylaminophenyl (meth)acrylate, p-N,N-dimethylaminobenzyl (meth)acrylate, p-N,N-diethylaminobenzyl (meth)acrylate, p-N,N-dipropylaminobenzyl (meth)acrylate, p-N,N-dibutylaminobenzyl (meth)acrylate, p-N-laurylaminobenzyl (meth)acrylate, or p-N-stearylaminobenzyl (meth)acrylate.

In Formula (4), $R^2$ represents a hydrogen atom or a methyl group, and $R^{34}$ represents a divalent organic group having 1 to 7 carbon atoms. Such an organic group may include chain-like or cyclic aliphatic alkenyl groups and divalent aromatic hydrocarbon groups. In Formula (4), $R^{44}$ and $R^{54}$ each independently represent a hydrogen atom or an organic group having 1 to 20 carbon atoms. Such an organic group may include chain-like or cyclic aliphatic alkyl groups and aromatic hydrocarbon groups. $R^{44}$ and $R^{54}$ may also chemically combine to form a cyclic structure consisting of the nitrogen atom to which these are bonded and, in addition thereto, 4 to 20 carbon atoms. $R^{44}$ and $R^{54}$ may also chemically combine to form a cyclic structure consisting of the nitrogen atom to which these are bonded and, in addition thereto, at least one selected from an oxygen atom, a nitrogen atom, and a sulfur atom and 4 to 19 carbon atoms. The amino group-containing monomer represented by Formula (4) may specifically include N,N-dimethylaminoethyl (meth)acrylamide, N,N-diethylaminoethyl (meth)acrylamide, N,N-dimethylaminopropyl (meth)acrylamide, N,N-diethylaminopropyl (meth)acrylamide, p-N,N-dimethylaminophenyl (meth)acrylamide, p-N,N-diethylaminophenyl (meth)acrylamide, p-N,N-dipropylaminophenyl (meth)acrylamide, p-N,N-dibutylaminophenyl (meth)acrylamide, p-N-laurylaminophenyl (meth) acrylamide, p-N-stearylaminophenyl (meth)acrylamide, p-N,N-dimethylaminobenzyl (meth)acrylamide, p-N,N-diethylaminobenzyl (meth)acrylamide, p-N,N-dipropylaminobenzyl (meth)acrylamide, p-N,N-dibutylaminobenzyl (meth)acrylamide, p-N-laurylaminobenzyl (meth)acrylamide, or p-N-stearylaminobenzyl (meth)acrylamide. Here, the term "(meth)acrylamide" is used to refer to an acrylamide or a methacrylamide (the same applies hereinafter).

In Formula (5), $R^{25}$ represents a hydrogen atom or a methyl group. $R^{35}$ represents a hydrogen atom or an alkyl group having 8 or less carbon atoms; and n represents an integer of 2 or 3 and m represents an integer of any of 1 to 30. The polar group-containing monomers represented by Formula (5) may specifically include polyethylene glycol mono(meth)acrylate, polypropylene glycol mono(meth)acrylate, methoxypolyethylene glycol mono(meth)acrylate, methoxypolypropylene glycol mono(meth)acrylate, ethoxypolyethylene glycol mono(meth)acrylate, ethoxypolypropylene glycol mono(meth)acrylate, octoxypolyethylene glycol mono (meth)acrylate, octoxypolypropylene glycol mono(meth) acrylate, lauroxypolyethylene glycol mono(meth)acrylate, lauroxypolypropylene glycol mono(meth)acrylate, stearoxypolyethylene glycol mono(meth)acrylate, or stearoxypolypropylene glycol mono(meth)acrylate. In Formula (6), $R^{26}$ represents a hydrogen atom or a methyl group. $R^{46}$ and $R^{56}$ each independently represent a hydrogen atom or an organic group having 1 to 20 carbon atoms. Such an organic group may include chain-like or cyclic aliphatic alkyl groups and aromatic hydrocarbon groups. $R^{46}$ and $R^{56}$ may also chemically combine to form a cyclic structure consisting of the nitrogen atom to which these are bonded and, in addition thereto, 4 to 20 carbon atoms. $R^{46}$ and $R^{56}$ may also chemically combine to form a cyclic structure consisting of the nitrogen atom to which these are bonded and, in addition thereto, at least one selected from an oxygen atom, a nitrogen atom, and a sulfur atom and 4 to 19 carbon atoms. The polar group-containing monomer represented by Formula (6) may specifically include the following.

As N-substituted (meth)acrylamides, N,N-dimethyl (meth)acrylamide, N-methyl (meth)acrylamide, N-isopropyl (meth)acrylamide, N-butoxymethyl (meth)-acrylamide, N-tert-butyl (meth)acrylamide, N-phenyl (meth)acrylamide, and N-methylol (meth)acrylamide; and as (meth)acrylamides containing a cyclic structure, N-(meth)acryloyl morpholine, N-(meth)acryloyl pyrrolidone, N-(meth)acryloyl piperidine, N-(meth)acryloyl pyrrolidine, or N-(meth)acryloyl-4-pyrrolidone. Here, the term "(meth)acryloyl" is used to refer to an acryloyl or a methacryloyl compound.

As described above, the monomers constituting the copolymer of the present invention include at least one monomer selected from the acrylate or methacrylate monomers represented by Formulas (1) and (2); at least one monomer selected from the amino group-containing monomers represented by Formulas (3) and (4); and at least one monomer selected from the polar group-containing monomers represented by Formulas (5) and (6).

As the monomers constituting the copolymer of the present invention, any other monomer(s) copolymerizable with these monomers may be contained as long as the function of the above monomer units in the copolymer is not negatively affected.

Such other monomer(s) may specifically be exemplified by, as acrylate or methacrylate monomers, acrylate or methacrylate monomers other than those represented by Formulas (1) and (2), and the ones listed as follows: as styrene derivatives, styrene, α-methyl styrene, β-methyl styrene, o-methyl styrene, m-methyl styrene, p-methyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, p-methoxyl styrene, and p-phenyl styrene; as vinyl esters, vinyl acetate, vinyl propionate, vinyl butyrate, vinyl benzoate, or vinyl formate; as vinyl ethers, vinyl methyl ether, vinyl ethyl ether, or vinyl isobutyl ether; or as vinyl ketones, vinyl methyl ketone, vinyl hexyl ketone, or vinyl isopropyl ketone.

With respect to the proportions in which these monomer units are contained in the copolymer, the acrylate or methacrylate monomer unit(s) represented by Formula (s) (1) and/or (2) may preferably be in a proportion from 1% by mass to 50% by mass. The amino group-containing monomer(s) represented by Formula(s) (3) and/or (4) may preferably be in a proportion from 2% by mass to 99% by mass. The polar group-containing monomer(s) represented by Formula (s) (5) and/or (6) may preferably be in a proportion from 0.1% by mass to 40% by mass. The other monomer(s) may preferably be in a proportion from 0% by mass to 50% by mass.

The copolymer may preferably have a mass average molecular weight (Mw) from 2,000 or more to 500,000 or less, more preferably from 3,000 or more to 300,000 or less, and still more preferably from 5,000 or more to 200,000 or less. As long as the copolymer has a mass average molecular weight (Mw) of 2,000 or more, the copolymer can be prevented from exuding out of the electrophotographic functional component parts to be obtained using the copolymer. As long as the copolymer has a mass average molecular weight (Mw) of 500,000 or less, the copolymer can be prevented from having a low affinity for the urethane resin and so forth.

The copolymer may preferably have a glass transition temperature (Tg) from −100° C. or more to 180° C. or less, more preferably from −90° C. or more to 170° C. or less, and still more preferably from −80° C. or more to 160° C. or less. As long as the copolymer has a glass transition temperature (Tg) of −100° C. or more, the molded product to be obtained can be prevented from being highly viscous and can also be prevented from having an excess coefficient of friction. As long as the copolymer has a glass transition temperature (Tg) of 180° C. or less, it can be readily mixed with other resins and can be uniformly dispersed therein.

The copolymer may preferably have an amine value from 0.5 mgKOH/g or more to 350 mgKOH/g or less, more preferably from 0.8 mgKOH/g or more to 345 mgKOH/g or less, and still more preferably from 1 mgKOH/g or more to 340 mgKOH/g or less. As long as the copolymer has an amine value of 0.5 mgKOH/g or more, it can function well enough to promote the urethanation reaction. As long as it has an amine value of 350 mgKOH/g or less, it can decrease the surface tackiness in the electrophotographic functional component parts to be obtained.

Such an amine value may be employed as a value measured by neutralization titration.

There are no particular limitations on a process for producing the copolymer, as long as it is a process of copolymerizing the above monomers, such as bulk polymerization, solution polymerization, emulsion polymerization, and suspension polymerization. Any of these processes may be used. Of these, solution polymerization is preferred in view of an advantage that the reaction can be controlled with ease. A solvent used in the solution polymerization may include, e.g., xylene, toluene, ethyl acetate, isobutyl acetate, isopropyl alcohol methanol, methyl ethyl ketone, methyl isobutyl ketone, or N,N-dimethylformamide or dimethylformamide. The solvent may preferably be used in an amount of, e.g., 100 parts by weight based on 30 parts by weight to 400 parts by weight of the monomers.

A polymerization initiator used in producing the copolymer may include, e.g., t-butyl peroxy-2-ethylhexanoate, cumyl perpivarate, t-butyl peroxylaurate, benzoyl peroxide, lauroyl peroxide, octanoyl peroxide, di-t-butyl peroxide, t-butylcumyl peroxide, dicumyl peroxide, 2,2'-azobisisobutyronitrile, 2,2'-azobis-(2-methylbutyronitrile), 2,2'-azobis-(2,4-dimethylvaleronitrile), 2,2'-azobis-(4-methoxy-2,4-dimethylvaleronitrile), or dimethyl 2,2'-azobis-(2-methyl propionate). Any of these may be used alone or in combination of two or more types.

The polymerization initiator may preferably be used in an amount from 0.05 part by weight or more to 30 parts by weight or less, and more preferably from 0.1 part by weight or more to 15 parts by weight or less, based on 100 parts by weight of the monomers. As long as the polymerization initiator is used in an amount of 0.05 part by weight or more based on 100 parts by weight of the monomers, the polymerization reaction may be efficiently carried out. As long as it is used in an amount of 30 parts by weight or less, the difficulties that can result from the incorporation of the polymerization initiator into the terminals of the copolymer can be prevented.

The polymerization reaction may preferably be carried out at a temperature from 40° C. or more to 150° C. or less, which may appropriately be set in accordance with the solvent, polymerization initiator, and monomers to be used.

The resin for electrophotographic functional component parts of the present invention is a resin that contains a urethane resin obtained using a urethane material containing a polyol component and an isocyanate component, wherein the urethane material contains the above copolymer.

The copolymer may be used in an amount ranging from 0.1% by mass to 15% by mass.

The urethane resin contained in the resin for electrophotographic functional component parts of the present invention is a high polymer having a urethane linkage (—NH—COO—) and is obtained using a urethane material containing an isocyanate component having an isocyanate group (—NCO) and a polyol component having a hydroxyl group (—OH).

The isocyanate component may include tolylene diisocyanate (TDI), 4,4'-methylenediphenyl diisocyanate (MDI), crude MDI (polymeric MDI) and modified MDI, which are general-purpose, and a special isocyanate. Such a special isocyanate component may include, e.g., 1,5-naphthalene diisocyanate, tolidine diisocyanate, hexamethylene diisocyanate, isophorone diisocyanate, p-phenylene diisocyanate, trans-cyclohexane 1,4-diisocyanate, xylylene diisocyanate (XDI), hydrogenated XDI, hydrogenated MDI, lysine diisocyanate, triphenylmethane triisocyanate, tris(isocyanatophenyl) thiophosphate, tetramethylxylene diisocyanate, lysine ester diisocyanate, 1,6,11-undecane triisocyanate, 1,8-diisocyanate-4-isocyanate methyloctane, 1,3,6-hexamethylene triisocyanate, bicycloheptane triisocyanate, or trimethyl hexamethylene diisocyanate. A blocked isocyanate may also be used, which has a structure wherein an isocyanate is masked with a blocking agent. The blocked isocyanate does not react at room temperature and the isocyanate group is regenerated upon heating to a temperature at which the blocking agent dissociates. Any of these may be used alone or in combination of two or more types.

The polyol component may include, e.g., polyoxypropylene glycol (PPG), polytetramethylene ether glycol (PTMG), a THF-alkylene oxide copolymer polyol, a polyester polyol, an acrylic polyol, a polyolefin polyol, a partially saponified product of an ethylene-vinyl acetate copolymer, a phosphate type polyol, a halogen-containing polyol, an adipate type polyol, a polycarbonate type polyol, a polycaprolactone type polyol, or a polybutadiene polyol.

A catalyst may optionally be contained in the urethane material. The catalyst may include, e.g., triethylamine, N,N,N',N'-tetramethylethylenediamine, N,N,N',N'',N''-pentamethyldiethylenediamine, triethylenediamine, dimethylaminoethanol, or bis(2-dimethylaminoethyl)ether. The use of the above copolymer enables any of these catalysts to be used in a smaller quantity. For example, the catalyst may preferably be used in an amount ranging from 0.05 part by weight or more to 5 parts by weight or less based on 100 parts by weight of the polyol component and the isocyanate component in total.

To obtain the urethane resin by using the above urethane material, it is preferable to add the above copolymer and, optionally, a solvent to the polyol component. To add the copolymer to the polyol component, a method is available in which the polyol component and the copolymer are mixed together as they are and a method in which the polyol component and a solution of the copolymer are mixed together. In the case when the isocyanate component is added to the polyol component and the solvent is added, the solvent may be removed by evaporation, optionally followed by heating to obtain the urethane resin.

The resin for electrophotographic functional component parts, which contains the urethane resin thus obtained, may also contain a different resin and functional components as exemplified by a conductive agent, such as carbon black or a metal oxide, and a stabilizing agent of various types, as long as the function of the urethane resin is not damaged.

The different resin that may also be contained in the resin for electrophotographic functional component parts may specifically be styrene resin (a homopolymer or copolymer which contains styrene or a styrene substitution product), acrylic resin (a homopolymer or copolymer which contains an acrylate or methacrylate), vinyl chloride resin, a styrene-vinyl acetate copolymer, rosin modified maleic resin, phenol resin, epoxy resin, polyester resin, fluorine resin, low-molecular weight polyethylene, low-molecular weight polypropylene, ionomer resin, polyurethane resin, nylon resin, silicone resin, ketone resin, an ethylene-ethyl acrylate copolymer, xylene resin, or polyvinyl butyral resin. Of these, the urethane resin, the nylon resin, the acrylic resin, and fluorine resin are preferred as they provide superior wear resistance, toner chargeability, toner transportability, and so forth.

The resin for electrophotographic functional component parts may be used in molding for electrophotographic apparatus component parts, such as charging rollers or charging blades, developing rollers or developing blades, toner feed rollers, and so. The component parts obtained by molding using the resin of the present invention can be free from surface tackiness, prevent the toner from adhering thereto, prevent any bleed-out from occurring therefrom over a long period of time, and prevent the component parts themselves from being stained.

The developing roller of the present invention has an electrically conductive shaft and an elastic layer and at least one cover layer, in this order, superposed on the peripheral surface of the shaft. This roller develops an electrostatically charged image on an electrostatically charged image bearing member by the use of a negatively chargeable developer carried on its surface. Then, the cover layer serving as a surface layer contains the above copolymer as a positive charge control resin.

The electrically conductive shaft in the developing roller of the present invention may suffice as long as it has sufficient strength to be durable at the time of molding and during actual service. This shaft may have a columnar, cylindrical, or the like shape, which may have an outer diameter, e.g., from 4 mm to 10 mm.

The electrically conductive shaft may be made of a material, which may include metals or alloys, such as iron, copper, stainless steel, aluminum, aluminum alloys, or nickel. For the purpose of scratch resistance and rust prevention, such an electrically conductive shaft may be subjected to a surface treatment, such as plating, as long as its conductivity is not negatively affected.

The elastic layer is used to provide the developing roller with elasticity so as to ensure a better contact with the electrostatically charged image bearing member. Preferably, this layer is electrically conductive. The elastic layer may be either a solid or a foam and may consist of a single layer or of two or more layers. The elastic layer may be made of a material, which includes, e.g., rubber materials, such as natural rubber, silicone rubber, urethane rubber, ethylene propylene rubber, butadiene rubber, chloroprene rubber, neoprene rubber, isoprene rubber or NBR (acrylonitrile butadiene rubber), to which a conductive agent has optionally been added. Examples of the conductive agents include carbon black and graphite.

To form the elastic layer, a method may be used in which raw materials are mixed and the obtained mixture is shaped by extrusion, injection molding, or compression molding. The elastic layer may be directly formed on the electrically conductive shaft by such a method, or it may be formed by covering the electrically conductive shaft with an extruded or molded product tube or sheet formed previously as the elastic layer. After the elastic layer has been provided, its surface may be sanded to adjust its shape.

The cover layer provides the surface of the developing roller with a high positive chargeability so that the negatively chargeable developer can be sufficiently negatively charged. The cover layer may have at least one layer, and, where it has a plurality of layer, the cover layer serving as a surface layer contains the copolymer positive charge control resin in the resin serving as a chief component. The chief component resin and any other resin contained therein, which make up the cover layer, may specifically include styrene resin (a homopolymer or copolymer, which contains styrene or a styrene substitution product), acrylic resin (a homopolymer or copolymer, which contains an acrylate or methacrylate), vinyl chloride resin, a styrene-vinyl acetate copolymer, rosin modified maleic resin, phenol resin, epoxy resin, polyester resin, fluorine resin, low-molecular weight polyethylene, low-molecular weight polypropylene, ionomer resin, polyurethane resin, nylon resin, silicone resin, ketone resin, an ethylene-ethyl acrylate copolymer, xylene resin, or polyvinyl butyral resin. Of these, the urethane resin, the nylon resin, the acrylic resin, and the fluorine resin are preferred as they provide superior wear resistance, toner chargeability, toner transportability, and so forth.

In the chief-component resin constituting the cover layer, the above copolymer is contained as a positive charge control resin. The copolymer may preferably be contained therein in an amount ranging from 0.1% by mass to 15% by mass. As long as content of the positive charge control resin is within the above range, the toner can be sufficiently negatively charged. Such a cover layer may preferably be a layer formed using the above resin for electrophotographic functional component parts.

At least one additive, such as a conductive agent, and a resin may be incorporated into the cover layer, as long as the function of the copolymer is not negatively affected. The conductive agent is, preferably, carbon black, graphite, conductive particles, or conductive rubber. The carbon black is preferably, e.g., furnace black, lamp black, thermal black, acetylene black, or channel black. The carbon black may be contained in the cover layer in an amount ranging from 1% by mass to 40% by mass. As long as the carbon black content is within the above range, the toner can be prevented from sticking to the developing roller surface because of the charge-up of the toner and the toner can be prevented from being poorly electrostatically charged.

It is preferable for the content of the resin other than the chief-component resin to be from 0% by mass to 5% by mass, because of the improvement in properties that can be achieved due to its addition.

The surface of the cover layer may be uneven. In order to form this unevenness, it is preferable to incorporate spherical particles into the cover layer, because an appropriate surface roughness can be achieved with a small quantity of these particles. Such spherical particles may be made of a material, which includes acrylic resins, such as polyacrylate and polymethacrylate, polyamide resins, such as nylon, polyolefin resins, such as polyethylene and polypropylene, silicone resins, phenolic resins, polyurethane resins, styrene resins, benzoguanamine, polyvinylidene fluoride resins, metal oxide powders such as silica powder, alumina powder, titanium oxide powder, or iron oxide powder.

The surface roughness of the cover layer may be controlled within the desired range by controlling the particle size and particle content or the thickness of the cover layer.

The cover layer used as a surface layer may preferably have a thickness from 2 μm or more to 100 μm or less so as not to negatively affect the flexibility of the elastic layer and also from the viewpoint of wear resistance.

The cover layer may be formed by molding or coating. A coating method may be used in which the optionally selected positive charge control resin, the conductive agent, such as carbon black, and the resin are diluted with a solvent, such as methyl ethyl ketone, toluene, alcohol or water. Then, a curing agent or a curing catalyst is added, followed by stirring, to prepare a coating fluid, which is used to form a coating film, for example, by spraying or dipping, optionally followed by heating to effect curing.

The developing roller of the present invention may include as an example thereof what is shown in FIGS. 1A and 1B as a side view and as a schematic sectional view along the axis of the roller, respectively. As shown in FIGS. 1A and 1B, a developing roller 24 has an electrically conductive shaft 114a and, provided thereon, an elastic layer 114b and a cover layer 114c as a surface layer.

The electrophotographic apparatus of the present invention has an electrostatically charged image bearing member, a charging assembly for electrostatically charging the surface of the electrostatically charged image bearing member uniformly, and an electrostatically charged image forming unit for forming an electrostatically charged image on the electrostatically charged image bearing member thus charged. It further has a developing assembly for transporting a negatively chargeable developer to the electrostatically charged image formed on the surface of the electrostatically charged image bearing member to form a toner image thereon and a transfer assembly for transferring the toner image to a recording material.

Such an electrophotographic apparatus may be, for example, a laser beam printer shown in FIG. 2 schematic structural view). As shown in FIG. 2, the electrophotographic apparatus is provided with a photosensitive member 9 that is the electrostatically charged image bearing member, a charging assembly having a charging roller 19, which electrostatically and uniformly charges the surface of the photosensitive member, an electrostatically charged image forming unit for forming electrostatically charged images on the photosensitive member by means of a laser beam L, and a developing assembly 10, which develops the electrostatically charged images thus formed. This developing assembly is provided with a developer container 12 holding therein a negatively chargeable developer 11 (hereinafter "toner") and the developing roller 24 shown in FIGS. 1A and 1B, which is disposed so as to close an opening of the developer container 12 and partly protrude outside thereof. Further, the developer container 12 is provided therein with a toner feed roller 25 with which the toner that remains on the developing roller without being used in the development of the electrostatically charged images on the photosensitive member is scraped off the surface of the developing roller and also through which a fresh toner held in the developer container is fed to the developing roller. The toner scraped off the developing roller is mixed with the toner held in the developer container so that the former's electric charges may be taken up by the latter. The developing assembly 10 is further provided with a blade 16, which is disposed so as to be kept in contact with the developing roller 24. The blade and the developing roller are connected to a constant-voltage power source 18 from which a negative-charge developing bias voltage is applied to the blade, where the toner fed onto the developing roller is rubbed between the blade and the developing roller as the developing roller is rotated in the direction of an arrow to be electrostatically negatively charged and at the same time form into a thin layer 11a. A thin toner layer formed on the developing roller moves to the electrostatically charged images formed on the photosensitive member 9 at a zone where it faces the photosensitive member, which is connected to a reference potential point. Thus, toner images are formed.

The laser beam printer is also provided with a transfer assembly using which the toner images formed on the photosensitive member are transferred to a recording material, a fixing assembly in which the toner images transferred to the recording material are fixed thereto, and a cleaning assembly with which the toner and so forth remaining on the photosensitive member after transfer are removed.

Even in high-speed and high-image quality laser beam printers, a sufficient quantity of the toner can be fed to the electrostatically charged images because the negative chargeability of toner has been improved, and the decrease in image density and fogging are prevented over a long period of time.

EXAMPLES

The copolymer of the present invention, the resin for electrophotographic functional component parts made using the copolymer, the developing roller made using the resin, and the electrophotographic apparatus with this developing roller are described below in greater detail by giving Examples. The technical scope of the copolymer, the resin for electrophotographic functional component parts, the developing roller, and the electrophotographic apparatus of the present invention is not limited to these Examples.

As (meth)acrylate monomers A1 to A3 used in the following Examples and Comparative Examples, Light Ester EH (trade name; available from Kyoeisha Chemical Co., Ltd.) was used as A1, Light Ester FA-108 (trade name; available from Kyoeisha Chemical Co., Ltd.) as A2, and Light Ester M (trade name; available from Kyoeisha Chemical Co., Ltd.) as A3. As amino group-containing monomers B1 to B3, Light Ester DM (trade name; available from Kyoeisha Chemical Co., Ltd.) was used as B1, Light Ester DE (trade name; available from Kyoeisha Chemical Co., Ltd.) as B2, and DMAPAA (trade name; available from Kohjin Co., Ltd.) as B3. As polar group-containing monomers C1 to C3, BLENMER PME-1000 (trade name; available from NOF Corporation) was used as C1, BLENMER PP-800 (trade name; available from NOF Corporation) as C2, and DMAA (trade name; available from Kohjin Co., Ltd.) as C3. Structural formulas of these monomers are shown below:

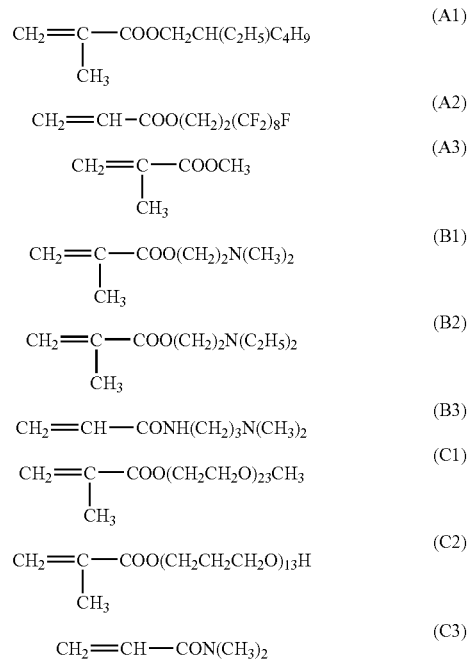

Example 1

Production of Copolymer 1

The following monomers were used.
2-Ethylhexyl methacrylate (A1) as a (meth)acrylate monomer: 10 g.
N,N-dimethylaminoethyl methacrylate (B1) as an amino group-containing monomer: 30 g.
Methoxypolyethylene glycol monomethacrylate (C1) as a polar group-containing monomer: 10 g.

The above monomers and 37.5 g of toluene and 12.5 g of ethanol, as solvents, and 2.0 g of 2,2'-azobis-(2-methyl propionate), as a polymerization initiator, were introduced into a four-necked separable flask provided with a stirrer, a condenser, a thermometer, and a nitrogen feed pipe. These were stirred at 80° C. for 8 hours in a stream of nitrogen to carry out solution polymerization. Thereafter, the product obtained was dried under reduced pressure to obtain Copolymer 1.

The amine value, mass average molecular weight (Mw), and Tg of the obtained Copolymer 1 were measured in the following way. The results are shown in Table 1 below.

The amine value was measured with a full-automatic titrator (AT510, trade name; manufactured by Kyoto Electronics Manufacturing Co., Ltd.). Copolymer 1 was dissolved with an ethanol-toluene 1:2 mixed solvent at a concentration of 0.1% by mass and then titrated with a 0.1M hydrochloric acid ethanol solution.

The mass average molecular weight (Mw) was measured by GPC (gel permeation chromatography) (apparatus: HLC8120 GPC, trade name; manufactured by Tosoh Corporation; columns: two SHODEX KF-805L, trade name; available from Showa Denko K.K.). Copolymer 1 was dissolved in THF (tetrahydrofuran) at a concentration of 0.25% by mass to measure a THF flow rate of 1 ml/min.

The Tg was measured by DSC (differential scanning calorimetry) (instrument: DSC6200, trade name; manufactured by Seiko Instruments, Inc.) according to JIS K 7121.

Examples 2 to 10 and Comparative Examples 1 to 3

Copolymers 2 to 13 were prepared in the same way as in Example 1, except that monomers shown in Table 1 were used. The amine value, mass average molecular weight (Mw), and Tg of the obtained copolymers were measured in the same way. The results are shown in Table 1 below.

Examples 12 to 15 and Comparative Examples 4 to 6

Test pieces of urethane resin were prepared in the same way as in Example 11, except that Copolymers 2 to 5 and 11 to 13, obtained in Examples 2 to 5 and Comparative Examples 1 to 3, respectively, were used. Their tackiness was measured in the same manner. The results are shown in Table 2.

TABLE 1

| Copolymer | (Meth)-acrylate monomer Type | Amt. (g) | Amino group = containing monomer Type | Amt. (g) | Polar group = containing monomer Type | Amt. (g) | Polymerization initiator (g) | Amino value (mgKOH/g) | Mw | Tg (° C.) |
|---|---|---|---|---|---|---|---|---|---|---|
| Example: | | | | | | | | | | |
| 1 | 1 | A1 | 10 | B1 | 30 | C1 | 10 | 2 | 218.9 | 12,900 | 1.6 |
| 2 | 2 | A2 | 5 | B2 | 35 | C2 | 10 | 0.5 | 213.3 | 85,300 | 7.2 |
| 3 | 3 | A1 | 20 | B1 | 20 | C1 | 10 | 4 | 139.4 | 4,500 | 7.3 |
| 4 | 4 | A2 | 5 | B2 | 40 | C2 | 5 | 2 | 239.2 | 18,400 | 2.2 |
| 5 | 5 | A1 | 10 | B3 | 25 | C3 | 15 | 2 | 182.5 | 12,300 | 8.8 |
| 6 | 6 | A1 | 10 | B1 | 35 | C1 | 5 | 2 | 255.3 | 12,900 | 7.7 |
| 7 | 7 | A2 | 10 | B2 | 35 | C1 | 5 | 0.5 | 213.3 | 85,300 | −6.2 |
| 8 | 8 | A2 | 15 | B1 | 20 | C1 | 15 | 4 | 139.4 | 4,500 | −1.5 |
| 9 | 9 | A2 | 10 | B2 | 35 | C2 | 5 | 2 | 209.3 | 18,400 | −2.2 |
| 10 | 10 | A1 | 10 | B3 | 30 | C3 | 10 | 2 | 219.0 | 12,300 | 2.2 |
| Comparative Example: | | | | | | | | | | |
| 1 | 11 | A3 | 10 | B1 | 30 | C1 | 10 | 2 | 211.5 | 13,500 | −3.6 |
| 2 | 12 | A1 | 10 | — | 0 | C1 | 40 | 2 | 0.0 | 10,800 | −4.5 |
| 3 | 13 | A2 | 10 | B2 | 40 | — | 0 | 2 | 246.3 | 11,700 | 3.7 |

Example 11

Production of Urethane Resin

FA-703 (trade name; available from Sanyo Chemical Industries, Ltd.) as a polyol component and COLONATE 1021 (trade name; available from Nippon Polyurethane Industry Co., Ltd.) as an isocyanate component were used in a total amount of 10 g such that the hydroxyl group in the polyol component and the isocyanate in the isocyanate component have equivalent weights. To these, 10% by mass of MEK (methyl ethyl ketone) and 0.3 g of Copolymer 1, obtained in Example 1, were added to prepare a sample solution. This sample solution was poured into a laboratory dish made of TEFLON and left to stand at room temperature for 5 hours to evaporate MEK, followed by heating at 60° C. for 30 minutes to prepare a urethane resin test piece.

The tackiness of the test piece was measured with Tackiness Tester TAC-II (trade name; manufactured by Rhesca Company Limited). The measurement was performed in an environment of N/N (normal temperature/normal humidity: 22° C., 55% RH) under the conditions of a preload of 100 gf, an indentation speed of 30 mm/min, an indentation load of 400 gf, an indentation time of 5 seconds, and a draw-up speed of 600 mm/min, and using a probe made of stainless steel having a cylindrical shape with a diameter of 5.1 mm. An average of values (peak values) measured three times was regarded as the value of tackiness. The results are shown in Table 2.

Example 16

A urethane resin test piece was prepared in the same manner as in Example 13, except that MEK was not used. Its tackiness was measured in the same manner. The results are shown in Table 2.

Comparative Example 7

A urethane resin test piece was prepared in the same manner as in Example 11, except that Copolymer 1 was not used. Its tackiness was measured in the same manner. The results are shown in Table 2.

TABLE 2

| | Copolymer | Tackiness (kPa) |
|---|---|---|
| Example: | | |
| 11 | 1 | 1.9 |
| 12 | 2 | 2.2 |
| 13 | 3 | 1.4 |
| 14 | 4 | 1.8 |
| 15 | 5 | 1.7 |
| 16 | 3 | 1.5 |
| Comparative Example: | | |
| 4 | 11 | 36.5 |
| 5 | 12 | Not urethanized. |
| 6 | 13 | 36.1 |
| 7 | None | 40.9 |

In Examples 11 to 16, the resins for electrophotographic functional component parts of the present invention containing any one of Copolymers 1 to 5 provided a substantially lower tackiness than the urethane resin in Comparative Example 7, which did not contain any copolymer of the present invention.

In Comparative Example 4, the urethane resin containing Copolymer 11, which is not a copolymer of the present invention as it contained as a copolymer component a methacrylate monomer containing an alkyl group having less than 4 carbon atoms, resulted in tackiness equal to that of the urethane resin of Comparative Example 7, which did not contain the copolymer.

In Comparative Example 5, the urethanation reaction did not proceed in the urethane resin containing Copolymer 12, which is not a copolymer of the present invention as it did not contain as a copolymer component any amino group-containing monomer.

In Comparative Example 6, in the urethane resin containing Copolymer 13, which is not a copolymer of the present invention as it did not contain as a copolymer component any polar group-containing monomer, Copolymer 13 underwent phase separation and did not provide any low tackiness.

From the foregoing, it is evident that the copolymer of the present invention has catalytic action in forming electrophotographic functional component parts and provides component parts with a low tackiness.

Example 17

Production of Developing Roller 1

A shaft of 8 mm in outer diameter was concentrically placed in a cylindrical mold of 16 mm in inner diameter. As a material for an elastic layer, a liquid conductive silicone rubber (available from Dow Corning Toray Silicone Co., Ltd.; Asker-C hardness: 35 degrees; volume resistivity: $10 \times 10^9$ $\Omega \cdot cm$) was cast into the mold, which was thereafter placed into a 130° C. oven to mold the rubber with heating for 20 minutes. After demolding, the molded product obtained was subjected to a secondary vulcanization for 4 hours in a 200° C. oven. Thus, a roller that had a 4 mm thick elastic layer was obtained.

Next, a urethane coating material (NIPPOLAN N5033, trade name; available from Nippon Polyurethane Industry Co., Ltd.) was diluted with methyl ethyl ketone so as to be at a solid matter concentration of 10%. Copolymer 6, as a positive charge control resin, and carbon black (#7360SB, trade name; available from Tokai Carbon Co., Ltd.), as a conductive agent, were added to the obtained solution in amounts of 10 parts by weight and 50 parts by weight, respectively, based on 100 parts by weight of the solid matter of the urethane coating material, and the respective components were thoroughly dispersed therein to obtain a dispersion. A modified TDI (COLONATE L, trade name; available from Nippon Polyurethane Industry Co., Ltd.), as a curing agent, and urethane particles of 14 μm in average particle diameter (ART PEARL C400, trade name; available from Negami Chemical Industrial Co., Ltd.), as a surface roughening material, were added to this dispersion in amounts of 10 parts by weight and 20 parts by weight, respectively, based on 100 parts by weight of the urethane coating material. Further, MEK was added to adjust the viscosity so as to obtain the desired surface roughness and prepare a coating fluid. The roller obtained previously by molding was coated with this coating fluid by dipping, followed by drying for 15 minutes in an 80° C. oven. Thereafter, the coating formed was cured for 4 hours in a 140° C. oven to obtain Developing Roller 1.

Using Developing Roller 1 thus obtained, images were formed in the following way, and the images obtained were evaluated. The results are shown in Table 3.

Initial-Stage Image Formation

The above Developing Roller 1 was fitted to a laser beam printer for evaluation, using a one-component developer composed of a negatively chargeable non-magnetic toner, and stated images (halftone images) were printed in an environment of 15° C. and 10% RH (L/L: low temperature/low humidity). An evaluation as to whether any blotches appeared on images was performed according to the following criteria. The blotches refer to image non-uniformity appearing on images in places in the shape of blotches.
A: Good.
B: Blotches appeared.

Running-Test Image Formation

The above laser beam printer was used in an environment of 32.5° C. and 80% RH (H/H: high temperature/high humidity), and character pattern images were continuously reproduced on 15,000 sheets to conduct a running test. Thereafter, images for evaluation were reproduced to evaluate image density, fogging and the charge quantity of the toner.

Image Density:

Solid black images were reproduced as images for evaluation. The image density was measured with a Macbeth Densitometer RD-918 (trade name; Sakata Inx Corporation) and evaluated according to the following criteria.
A: Very good (1.4 or more).
B: Good (1.2 or more to less than 1.4).
C: Poor (less than 1.2).

Fog:

Solid white images were reproduced as images for evaluation and their reflectance was measured. Further, the reflectance of a virgin recording material was measured. The value found by subtracting the maximum value of the reflectance of a virgin recording material from the worst value of the reflectance of solid white images was regarded as fog density, which was evaluated according to the following criteria. The reflectance was measured with a reflectometer TC-6DS (trade name; manufactured by Tokyo Denshoku K.K.).
A: Very good (less than 1.0%).
B: Good (1.0% or more to less than 2.0%).
C: Poor (2.0% or more).

Charge Quantity of Toner:

The toner carried on the developing roller was collected by suction using a metallic cylindrical tube and a cylindrical filter. In collecting it, the quantity Q of electric charges accumulated in a capacitor through the metallic cylindrical tube and the mass M of the toner collected were measured. The electric-charge quantity per unit mass Q/M (μC/g) was calculated from these measured values, and the value found was regarded as toner charge quantity (Q/M).

Examples 18 to 21 and Comparative Examples 8 to 10

Developing Rollers 2 to 8 were produced in the same way as in Example 17, except that Copolymers 7 to 13, respectively, were used in lieu of Copolymer 6. Images were formed for evaluation and to evaluate toner charge quantity in the same manner. The results are shown in Table 3.

Comparative Example 11

Developing Roller 9 was produced in the same manner as in Example 17, except that Copolymer 6 was not used. Images were formed for evaluation and to evaluate toner charge quantity in the same manner. The results are shown in Table 3.

TABLE 3

| Developing Roller | Co-polymer | Initial stage image evaluation: Blotches | Running image evaluation Fog | Running image evaluation Density | Toner charge quantity Q/M (μC/g) |
|---|---|---|---|---|---|
| Example: | | | | | |
| 17 | 1 | 6 | A | A | A | −50 |
| 18 | 2 | 7 | A | A | A | −55 |
| 19 | 3 | 8 | A | A | A | −57 |
| 20 | 4 | 9 | A | A | A | −56 |
| 21 | 5 | 10 | A | A | A | −58 |
| Comparative Example: | | | | | |
| 8 | 6 | 11 | A | C | B | −16 |
| 9 | 7 | 12 | A | C | C | −15 |
| 10 | 8 | 13 | C | A | A | −57 |
| 11 | 9 | — | A | C | C | −27 |

In each of Examples 17 to 21 and Comparative Example 10, the positive chargeability of the cover layer was improved, and the toner had a high charge quantity. Also, the running image evaluation showed good density and low fog images. In Comparative Example 8, which did not contain any (meth)acrylate monomer represented by Formula (1) or (2), in Comparative Example 9, which did not contain any amino group-containing monomer represented by Formula (3) or (4), and in Comparative Example 11, which did not contain any copolymer, a low toner charge quantity and serious fogging issues occurred. This is considered to be due to the fact that the developing roller surface was not sufficiently chargeable to the polarity opposite to that of the toner. In Comparative Example 10, which did not contain any polar group-containing monomer represented by Formula (5) or (6), good results were shown with respect to the toner charge quantity and the fog, but blotches appeared in the initial-stage images. This difficulty is presumed to be caused by a charge-up of the toner that occurred with respect to image characteristics.

From the foregoing, it is evident that the developing roller of the present invention can sufficiently electrostatically charge the toner to have negative electric charges and can transport the toner in a sufficient feed quantity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-226241, filed Aug. 31, 2007, and 2007-226250, filed Aug. 31, 2007, which are hereby incorporated by reference in their entirety.

What is claimed is:

1. A copolymer obtained by copolymerizing at least one monomer selected from acrylate or methacrylate monomers represented by Formulas (1) and (2), at least one monomer selected from amino group-containing monomers represented by Formulas (3) and (4) and at least one monomer selected from polar group-containing monomers represented by Formulas (5) and (6):

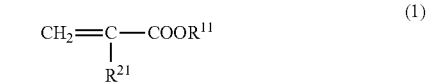

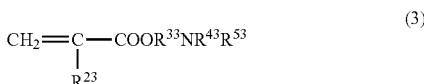

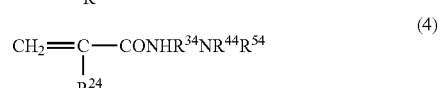

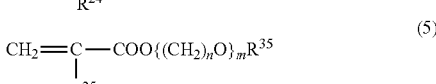

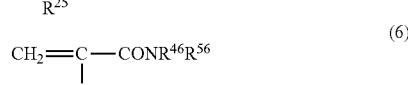

wherein $R^{11}$ represents an alkyl group having 4 or more carbon atoms; $R^{12}$ represents a fluoroalkyl group having 1 to 14 carbon atoms, having 3 or more fluorine atoms; $R^{21}$, $R^{22}$, $R^{23}$, $R^{24}$, $R^{25}$ and $R^{26}$ each independently represent a hydrogen atom or a methyl group; $R^{33}$ and $R^{34}$ each independently represent a divalent organic group having 1 to 7 carbon atoms; $R^{43}$, $R^{53}$, $R^{44}$, $R^{54}$, $R^{46}$ and $R^{56}$ each independently represent a hydrogen atom or an organic group having 1 to 20 carbon atoms, where $R^{43}$ and $R^{53}$, $R^{44}$ and $R^{54}$, and $R^{46}$ and $R^{56}$ may each chemically combine to form a cyclic structure consisting of the nitrogen atom to which these are bonded and 4 to 20 carbon atoms, or a cyclic structure consisting of the nitrogen atom to which these are bonded, at least one selected from an oxygen atom, a nitrogen atom and a sulfur atom and 4 to 19 carbon atoms; $R^{35}$ represents a hydrogen atom or an alkyl group having 8 or less carbon atoms; and n represents an integer of 2 or 3 and m represents an integer of any of 1 to 30.

2. The copolymer according to claim 1, which has a mass average molecular weight (Mw) of from 2,000 or more to 500,000 or less.

3. The copolymer according to claim 1, which has a glass transition temperature (Tg) of from −100° C. or more to 180° C. or less.

4. The copolymer according to claim 1, which has an amine value of from 0.5 mgKOH/g or more to 350 mgKOH/g or less.

5. A resin for electrophotographic functional component parts comprising a urethane resin obtained using a urethane material,
  wherein the urethane resin contains a polyol component and an isocyanate component, and
  wherein the urethane material comprises the copolymer according to claim 1.

6. A developing roller which comprises an electrically conductive shaft and superposedly formed on the peripheral surface of the shaft an elastic layer and at least one cover layer in this order, and develops an electrostatically charged image on an electrostatically charged image bearing member by the use of a negatively chargeable developer carried on the surface of the developing roller, wherein the cover layer serving as a surface layer contains the copolymer according to claim 1 as a positive charge control resin.

7. An electrophotographic apparatus which comprises an electrostatically charged image bearing member, a charging assembly for electrostatically charging the surface of the electrostatically charged image bearing member uniformly, an electrostatically charged image forming unit for forming an electrostatically charged image on the surface of the electrostatically charged image bearing member thus charged, a developing assembly for transporting a negatively chargeable developer to the electrostatically charged image formed on the surface of the electrostatically charged image bearing member, to form a toner image thereon, and a transfer assembly for transferring the toner image to a recording material, wherein the developing assembly comprises the developing roller according to claim 6.

* * * * *